United States Patent Office 3,112,319
Patented Nov. 26, 1963

3,112,319
TYROSINE DIKETOPIPERAZINE DERIVATIVES
Earl Eugene Fisher and Marvin T. Tetenbaum, Decatur, Ill., assignors to A. E. Staley Manufacturing Company, Decatur, Ill., a corporation of Delaware
No Drawing. Filed Apr. 17, 1961, Ser. No. 103,241
7 Claims. (Cl. 260—268)

This invention relates to ethers of tyrosine diketopiperazine. More specifically this invention relates to 3,6-di-(hydroxyalkoxybenzyl)-2,5-diketopiperazines and 3,6-di-(2,3-epoxypropoxybenzyl)-2,5-diketopiperazine (diglycidyl ether of tyrosine diketopiperazine).

Tyrosine is a readily available aminoacid having relatively few commercial uses. In our Serial No. 82,726 filed January 16, 1961, we disclosed a relatively simple process of preparing essentially pure tyrosine diketopiperazine in high yields from tyrosine. We have now found that tyrosine diketopiperazine can be used to prepare 3,6-di-p-(hydroxyalkoxybenzyl) - 2,5 - diketopiperazines wherein the alkoxy group has at least 2 carbon atoms and 3,6-di-p-(2,3-epoxypropoxybenzyl)-2,5-diketopiperazine.

The object of this invention is to prepare new and useful derivatives of tyrosine diketopiperazine.

We have attained this object by reacting tyrosine diketopiperazine with various epoxy compounds and epoxy progenitors in the presence of an alkaline condensation catalyst.

The various epoxy compounds and epoxy precursors, which can be used in this invention, include alkylene oxides, such as ethylene oxide and 1,2-propylene oxide; epihalohydrins, such as epichlorohydrin and epibromohydrin; alkylene carbonates, such as ethylene carbonate and 1,2-propylene carbonate; halohydrins, such as ethylene chlorohydrin and 1-chloro-2-hydroxy-hexane; etc. The various reactants can be used in a concentration as low as 2 moles per mole of tyrosine diketopiperazine. Usually it is preferable to use these epoxy compounds and epoxy precursors in a much higher concentration in order to get the best yields and in those cases where a liquid reactant such as epichlorohydrin is employed, it may be used as the reaction medium without any additional solvent.

Any of the common alkaline condensation catalysts such as sodium hydroxide, potassium hydroxide, tetramethylammonium hydroxide, etc. may be used. Instead of using these catalysts, tyrosine diketopiperazine is preferably converted to an alkali salt (phenolate). This salt readily reacts with alkylene carbonates and epoxies; and undergoes the Williamson synthesis with halohydrins and epihalohydrins, without any additional catalyst. The phenolate salt route enables us to carry out the reaction of this invention at temperatures from about 0° C. to about 125° C. or higher. On the other hand, when tyrosine diketopiperazine is condensed in an alkaline medium, either the reaction temperature should be maintained at from 0° C. to 40° C. or else the alkaline catalyst should be present in a maximum ratio of 2 moles of alkali per mol of tyrosine diketopiperazine in order to minimize alkaline hydrolysis of the diketopiperazine ring.

The various ethers of this invention can be used as resin plasticizers and/or stabilizers as well as starting materials for the preparation of resinous polymers. For example the diglycidyl ether of tyrosine diketopiperazine can be used in the same manner as the diglycidyl ether of bisphenol A. The dihydroxyethers can be used to prepare thermoplastic or thermosetting alkyd resins, while the tetrahydroxyethers can be used to prepare thermosetting alkyd resins.

The following examples are merely illustrative and should not be construed as limiting the scope of the invention.

*Example I*

Ninety-two and five-tenths grams of epichlorohydrin (1 mole) was placed in a 3-necked flask equipped with a stirrer, condenser, dropping funnel and nitrogen inlet. After the system was purged with nitrogen, it was heated to 65° C. Thirteen grams of tyrosine diketopiperazine (0.04 mole) and 3.2 grams of NaOH (0.08 mole) dissolved in 125 ml. water, were dropped into the reaction zone with rapid stirring and maintained at 65° C. for 3 hours. The reaction mixture was cooled to room temperature and the insoluble product was filtered off, washed with water and ethyl ether and then dried. The product weighed 13 grams. The solid after two recrystallizations from epichlorohydrin melted at 198–202° C. An oxirane analysis and infrared indicated that the diglycidyl ether had formed. The recrystallized product had 6.13% nitrogen (6.39% nitrogen theory).

*Example II*

Five grams of the diglycidyl ether of tyrosine diketopiperazine from the preceding example was hydrolyzed to the corresponding tetrahydroxy compound by heating at 100° C. in 100 ml. of 0.1 N HCl for 15 minutes. The insoluble product was filtered, washed with water and dried. It melted at 198°–202° C. An oxirane analysis indicated the substantial absence of oxirane oxygen. Accordingly, it appeared that the product was 3,6-di-p-(2,3-dihydroxypropoxybenzyl)-2,5-diketopiperazine.

This product can also be prepared directly by reacting tyrosine diketopiperazine with glycidol.

*Example III*

This example illustrates the preparation of 3,6-di-p-(2-hydroxyethoxybenzyl)-2,5-diketopiperazine. Four grams of sodium hydroxide (0.1 mole) was dissolved in 75 ml. of methanol by shaking for about 15 minutes. After 16.3 grams of tyrosine diketopiperazine (0.05 mole) was added to the methanol solution, all of the methanol was evaporated from the solution under a vacuum. The residue of gummy material and crystalline material was converted to crystalline disodio phenolate by adding ethyl ether and then filtering.

The disodio phenolate and 55 grams of ethylene carbonate were dissolved in 65 ml. dimethylformamide and then heated at 100° C. for 1½ hours. After the gelatinous mass was poured into 1 liter of aqueous KOH, it was boiled for a few minutes in order to remove all carbonate. On cooling 3,6-di-p-(2-hydroxyethoxybenzyl)-2,5-diketopiperazine precipitated. The precipitate was filtered, washed with water and then dried. The product, which weighed ten grams, was recrystallized from ethanol and water. It melted at 204–205° C. and had 6.86% nitrogen (theory 6.76% nitrogen). Infrared also confirmed the structure.

Since many embodiments of this invention may be made and since many changes may be made in the embodiments described, the foregoing is to be interpreted as illustrative only, and our invention is defined by the claims appended hereafter.

We claim:

1. A compound selected from the group consisting of 3,6-di-p-(2,3-epoxypropoxybenzyl) - 2,5 - diketopiperazine, 3,6-di-p-(hydroxy alkoxybenzyl)-2,5-diketopiperazine and 3,6-di-p-(dihydroxyalkoxybenzyl)-2,5-diketopiperazine.

2. 3,6-di-p-(2,3-epoxypropoxybenzyl) - 2,5 - diketopiperazine.

3. 3,6-di-p-(2-hydroxyethoxybenzyl)-2,5 - diketopiperazine.

4. 3,6-di-p-(2,3-dihydroxypropoxybenzyl)-2,5-diketopiperazine.

5. A method which comprises reacting tyrosine diketopiperazine with an etherifying compound selected from the group consisting of an epihalohydrin, a 1,2-halohydrin, a 1,2-alkylene oxide and a 1,2-alkylene carbonate, wherein said etherifying compound is present in a ratio of at least 2 moles per mole of tyrosine diketopiperazine, in the presence of an alkaline condensation catalyst present at a maximum concentration of two moles of alkali per mole of tyrosine diketopiperazine.

6. A method which comprises reacting an alkali metal phenolate of tyrosine diketopiperazine with an etherifying compound selected from the group consisting of an epihalohydrin, a 1,2-halohydrin, a 1,2-alkylene oxide and a 1,2-alkylene carbonate, wherein said etherifying compound is present in a ratio of at least 2 moles per mole of said alkali metal phenolate of tyrosine diketopiperazine.

7. A method which comprises reacting tyrosine diketopiperazine with an etherifying compound selected from the group consisting of an epihalohydrin, a 1,2-halohydrin, a 1,2-alkylene oxide and a 1,2-alkylene carbonate at a temperature of from 0° C. to 40° C. in the presence of an alkaline condensation catalyst, wherein said etherifying compound is present in a ratio of at least 2 moles per mole of tyrosine diketopiperazine.

References Cited in the file of this patent

UNITED STATES PATENTS

| 2,681,901 | Wiles and Elam | June 22, 1954 |
| 2,963,483 | Heywood | Dec. 6, 1960 |
| 2,965,609 | Newey | Dec. 20, 1960 |

OTHER REFERENCES

Gerzon et al.: Journal of Medicinal and Pharmaceutical Chemistry, volume 1, No. 3, pages 223–229 (1959).